(12) United States Patent
Dedhia et al.

(10) Patent No.: US 8,509,545 B2
(45) Date of Patent: Aug. 13, 2013

(54) FOREGROUND SUBJECT DETECTION

(75) Inventors: Bhaven Dedhia, Chapel Hill, NC (US); Tommer Leyvand, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 59 days.

(21) Appl. No.: 13/306,876

(22) Filed: Nov. 29, 2011

(65) Prior Publication Data
US 2013/0136358 A1 May 30, 2013

(51) Int. Cl.
*G06K 9/00718* (2006.01)

(52) U.S. Cl.
USPC ............ 382/224; 382/173; 382/103; 382/181

(58) Field of Classification Search
USPC ................. 382/103, 173, 118, 191, 181, 224; 345/156, 158, 157; 348/580, 218.1, 208.13; 359/463; 273/348.1, 409
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Rother, et al., "GrabCut"—Interactive Foreground Extraction using Iterated Graph Cuts, Retrieved at <<http://citeseerx.ist.psu.edu/viewdoc/download?doi=10.1.1.92.2154&rep=rep1&type=pdf>>, Special Interest Group on Computer Graphics and Interactive Techniques, Aug. 8-12, 2004, pp. 6.

(Continued)

*Primary Examiner* — Anh Do
(74) *Attorney, Agent, or Firm* — Alleman Hall McCoy Russell & Tuttle LLP (57) ABSTRACT

Classifying pixels in a digital image includes receiving a primary image from one or more image sensors. The primary image includes a plurality of primary pixels. A depth image from one or more depth sensors is also received. The depth image includes a plurality of depth pixels, each depth pixel registered to one or more primary pixels. The depth image and the primary image are cooperatively used to identify whether a primary pixel images a foreground subject or a background subject.

20 Claims, 6 Drawing Sheets

(56) References Cited

U.S. PATENT DOCUMENTS

| | | |
|---|---|---|
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,397,501 B2 * | 7/2008 | Afsenius ............... 348/218.1 |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,623,676 B2 * | 11/2009 | Zhao et al. ............... 382/103 |
| 7,663,689 B2 | 2/2010 | Marks |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |

| | | | |
|---|---|---|---|
| 8,035,614 B2 | 10/2011 | Bell et al. | |
| 8,035,624 B2 | 10/2011 | Bell et al. | |
| 8,072,470 B2 | 12/2011 | Marks | |
| 8,385,648 B2* | 2/2013 | Finlayson et al. | 382/173 |
| 2005/0271273 A1 | 12/2005 | Blake et al. | |
| 2008/0026838 A1 | 1/2008 | Dunstan et al. | |
| 2010/0061658 A1 | 3/2010 | Yamada | |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Wang, et al., "TofCut: Towards Robust Real-time Foreground Extraction Using a Time-of-Flight Camera", Retrieved at <<http://citeseerx.ist.psu.edu/viewdoc/download?doi=10.1.1.170.9597&rep=rep1&type=pdf>>, 3DPVT, May 2010, pp. 1-8.

Wang, et al., "Soft Scissors: An Interactive Tool for Realtime High Quality Matting", Retrieved at <<http://citeseerx.ist.psu.edu/viewdoc/download?doi=10.1.1.64.3777&rep=rep1&type=pdf>>, Special Interest Group on Computer Graphics and Interactive Techniques Conference, Aug. 5-9, 2007, pp. 6.

Corrigan, et al., "Video Matting Using Motion Extended Grabcut", Retrieved at <<http://citeseerx.ist.psu.edu/viewdoc/download?doi=10.1.1.140.4203&rep=rep1&type=pdf>>, 5th European Conference on Visual Media Production (CVMP), Nov. 26-27, 2008, pp. 9.

Ahn, et al., "Human tracking and silhouette extraction for human-robot interaction systems", Retrieved at <<http://cvpr.yonsei.ac.kr/publication/papers/injo/Human%20tracking%20and%20silhouette%20extraction%20for%20human-robot%20interaction%20systems.pdf>>, Pattern Analysis & Applications, vol. 12, No. 2, 2009, pp. 11.

Gordon, et al., "Background Estimation and Removal Based on Range and Color", Retrieved at <<http://citeseerx.ist.psu.edu/viewdoc/download?doi=10.1.1.29.1910&rep=rep1&type=pdf>>, IEEE Computer Society Conference on Computer Vision and Pattern Recognition, Jun. 1999, pp. 1-6.

Harville, et al., "Foreground Segmentation Using Adaptive Mixture Models in Color and Depth", Retrieved at <<http://citeseerx.ist.psu.edu/viewdoc/download?doi=10.1.1.24.39&rep=rep1&type=pdf>>, Proceedings IEEE Workshop on Detection and Recognition of Events in Video, 2001, pp. 9.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

* cited by examiner

FOREGROUND SUBJECT DETECTION

BACKGROUND

It is often desirable to identify a human or other subject within a digital image. If a human can be accurately identified and distinguished from the rest of the image, the human can be effectively separated from the rest of the image. For example, a human present in one location can be digitally cut out of an image and pasted into a completely different image, thus making it appear as if the human had actually been present in the scene of the other image. However, it can be difficult to accurately identify a human or other subject within a digital image.

SUMMARY

Classifying pixels in a digital image includes receiving a primary image from one or more image sensors. The primary image includes a plurality of primary pixels. A depth image from one or more depth sensors is also received. The depth image includes a plurality of depth pixels, each depth pixel registered to one or more primary pixels. The depth image and the primary image are cooperatively used to identify whether a primary pixel images a foreground subject or a background subject.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is directed to the classification of pixels in a digital image. In particular, the use of a depth sensor in combination with a primary image sensor is discussed. The information from the primary image sensor may be used to refine the depth image produced by the depth image sensor, as described in detail below. The refined depth image may then be used to separate a foreground object from the rest of the primary image.

Figure 1:
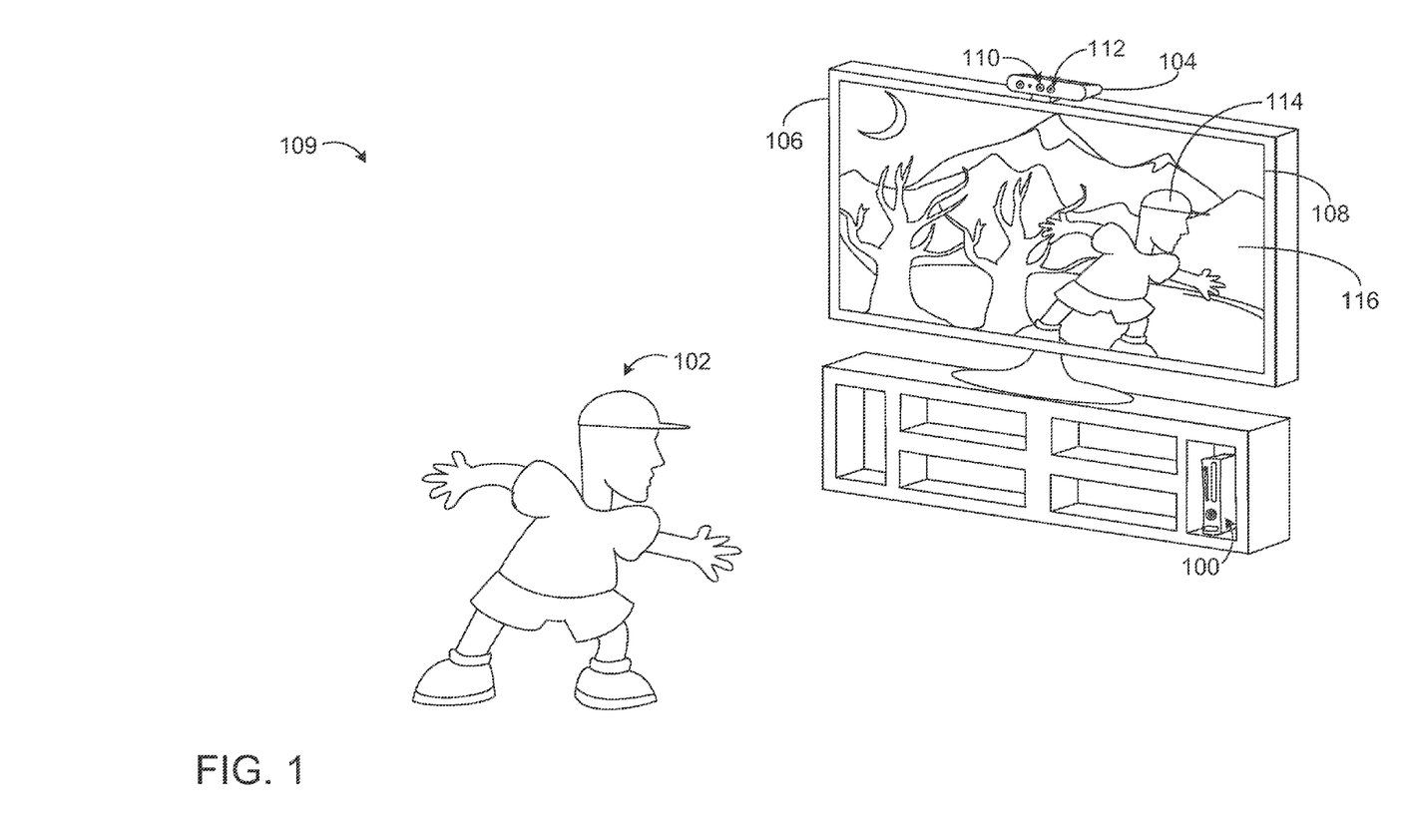
FIG. 1 shows a non-limiting example of a computing system in accordance with an embodiment of the present disclosure.

FIG. 1 shows a non-limiting example of a computing system 100 that is configured to monitor a human player 102 using a sensor array 104. Computing system 100 may be used to play a variety of different games, play one or more different media types, and/or control or manipulate non-game applications and/or operating systems. A display device 106 operatively connected to computing system 100 is shown presenting visuals 108 to human player 102.

The computing system 100 may include a sensor input to receive observation information from one or more sensors monitoring scene 109. As a non-limiting example, the computing system may include a universal serial bus configured to receive depth images and/or color images from one or more input devices including a depth sensor and/or an image sensor (e.g. camera). FIG. 1 shows the computing system 100 operatively connected to a sensor array 104 including one or more depth sensors 110 and one or more image sensors 112.

As shown, the computing system 100 may be configured to use depth sensors 110 and/or image sensors 112 to produce visuals 108 comprising an image 114 of human player 102 and virtual background 116. Such a configuration may produce a "green screen" effect, which will be discussed in detail below.

Figure 2:
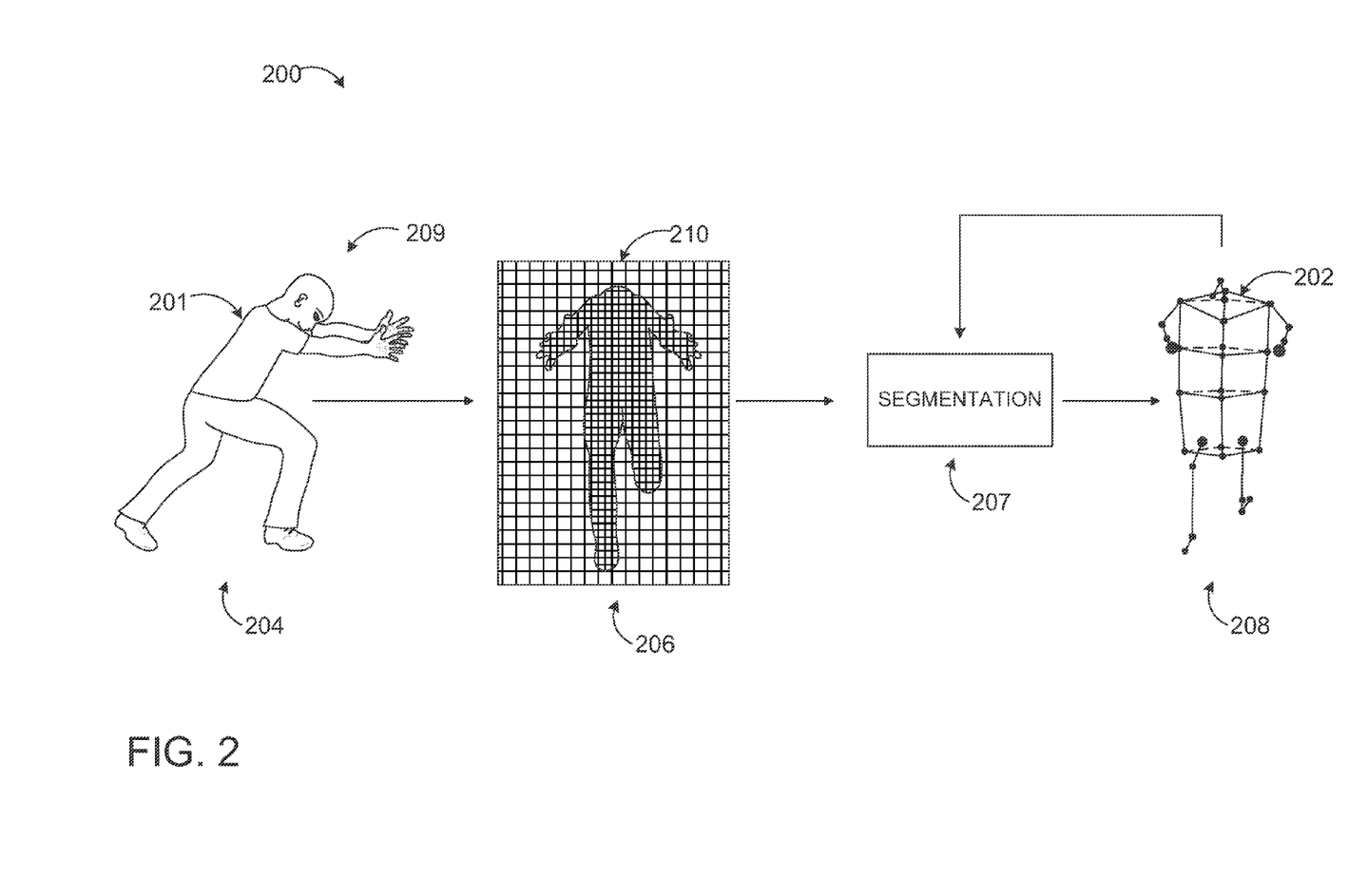
FIG. 2 shows an example pipeline for classifying pixels in a digital image.

To aid in the classification of pixels (e.g. by computing system 100 of FIG. 1), portions of a skeletal tracking pipeline may be used. The details of such a classification will be discussed later in reference to FIGS. 3 and 4. FIG. 2 shows a simplified processing pipeline 200 in which a human subject 201, e.g., the human player 102 of FIG. 1, is modeled as a virtual skeleton 202. FIG. 2 shows four stages of the processing pipeline 200: image collection 204, depth imaging 206, segmentation 207, and skeletal modeling 208. It will be appreciated that a processing pipeline may include additional steps and/or alternative steps than those depicted in FIG. 2 without departing from the scope of this disclosure.

As shown in FIG. 2, the three-dimensional appearance of human subject 201 and the rest of an observed scene 209 around human subject 201 may be imaged by one or more sensors (e.g., depth sensors 110 and image sensors 112 of FIG. 1). The sensors may determine, for each pixel, the three dimensional depth of a surface in the observed scene 209 relative to the depth sensors. Virtually any depth finding technology may be used without departing from the scope of this disclosure.

The three dimensional depth information determined for each pixel may be used to generate a depth image 210. Such a depth image may take the form of virtually any suitable data structure, including but not limited to a matrix that includes a depth value for each pixel of the observed scene. In FIG. 2, the depth image 210 is schematically illustrated as a pixelated grid of the silhouette of the human subject 201 and the surrounding environment. This illustration is for simplicity of understanding, not technical accuracy. It is to be understood that a depth image generally includes depth information for each individual pixel.

During segmentation, the depth image 210 is analyzed to identify pixels associated with foreground objects and pixels associated with background objects. Such segmentation may reduce the computational expense of skeletal modeling 208. Additionally or alternatively, such segmentation may be used to create a "green screening" effect. Segmentation 207 is discussed in more detail with reference to FIGS. 3, 4A, 4B, 4C, 4D, 5A, 5B, 5C, and 5D.

A virtual skeleton 202 may be derived from the depth image 210 to provide a machine readable representation of the human subject 201. In other words, the virtual skeleton 202 is derived from depth image 210 to model the human subject 201. The virtual skeleton 202 may be derived from the depth image 210 in any suitable manner. In some embodiments, one or more skeletal fitting algorithms may be applied to the depth image. The present disclosure is compatible with virtually any skeletal modeling techniques. As introduced above, only those pixels identified as foreground pixels may be modeled with a virtual skeleton to reduce the computational expense of the modeling process.

The virtual skeleton 202 may include a plurality of joints, and each joint may correspond to a portion of the human subject 201. Virtual skeletons in accordance with the present disclosure may include virtually any number of joints, each of which can be associated with virtually any number of parameters (e.g., three dimensional joint position, joint rotation, body posture of corresponding body part (e.g., hand open, hand closed, etc.) etc.). It is to be understood that a virtual skeleton may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc.).

Figure 3:
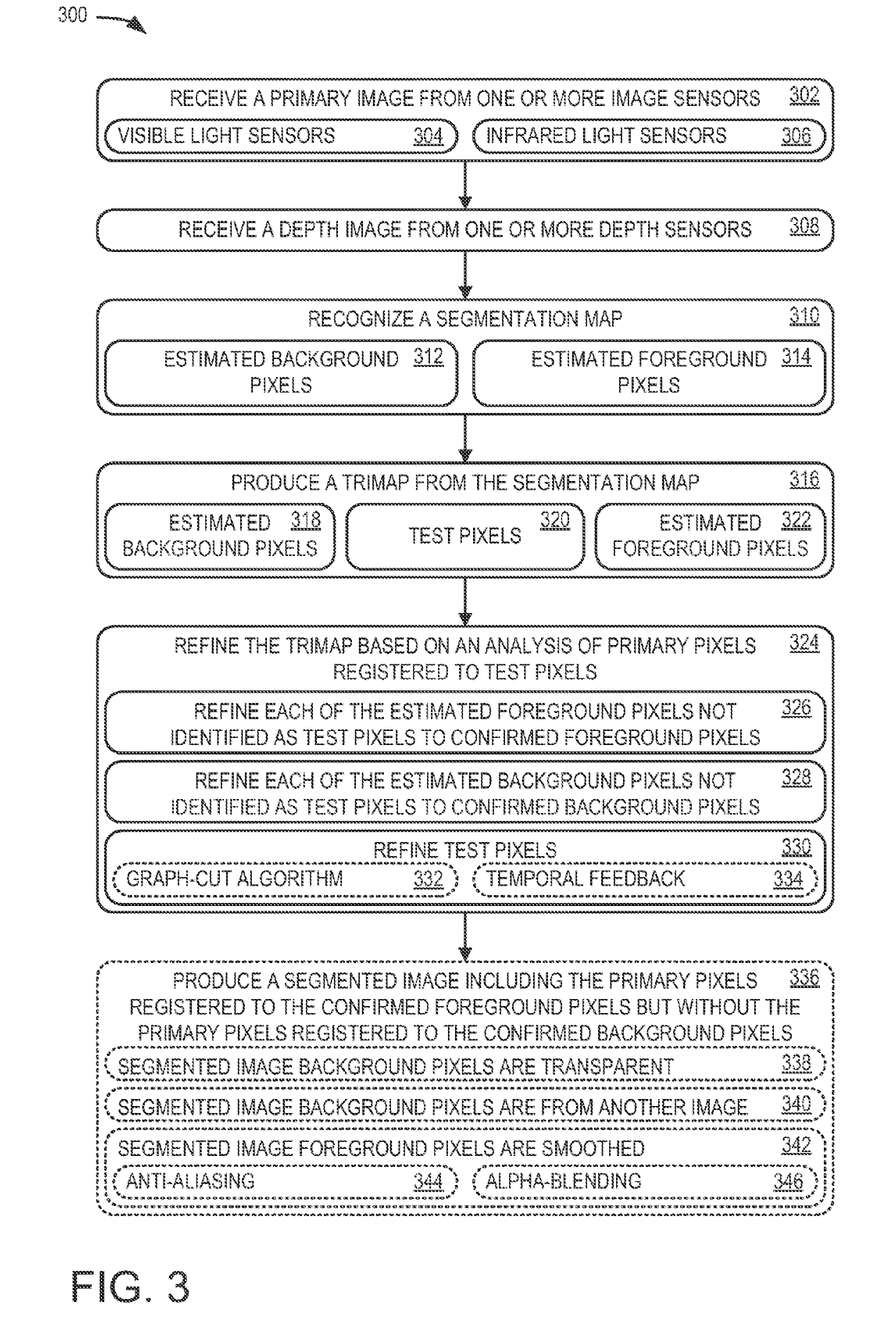
FIG. 3 shows a process flow depicting an embodiment of a segmentation method for classifying pixels in a digital image.

FIG. 3 shows a process flow depicting an embodiment of a segmentation method 300 for classifying pixels in a digital image. At 302, method 300 includes receiving a primary image from one or more image sensors. The image sensors may include one or more visible light sensors 304 and/or one or more infrared light sensors 306. Visible light sensors 304 may include, but are not limited to, webcams, digital video cameras, and digital cameras. Infrared light sensors 306 may include similar devices, however configured to process infrared light. Infrared light sensors may cooperate with structured light infrared projectors and/or time-of-flight infrared projectors to generate a depth image.

Figure 4A:
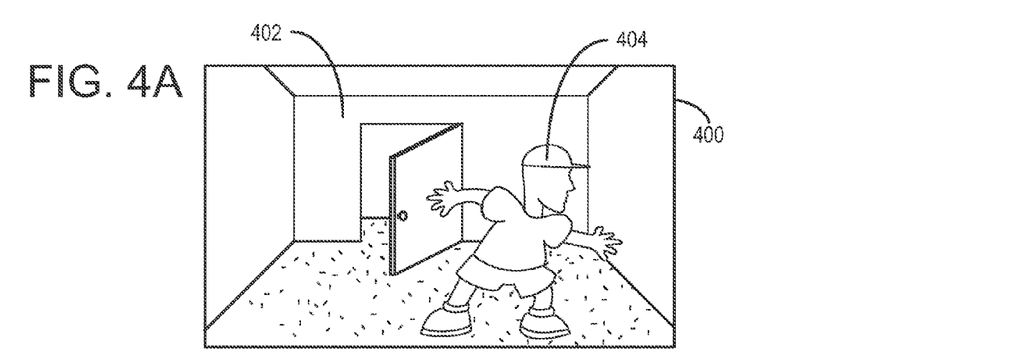
FIG. 4A shows a visual representation of a primary image imaging a scene comprising a foreground object and a background object.

For example, FIG. 4A shows a visual representation of a primary image 400 comprising a background object 402 and a foreground object 404 as imaged by the one or more depth sensors and the one or more primary image sensors.

Returning to FIG. 3, at 308, method 300 includes receiving a depth image from one or more depth sensors. Example depth sensors include depth cameras, video cameras, stereo cameras, and/or any other suitable device or combination of devices capable of measuring depth using any suitable technique (e.g., time-of-flight, structured light, stereo image, etc.).

In some embodiments, the depth sensor may share components with the primary image sensor(s).

At 310, method 300 includes recognizing a segmentation map. The segmentation map may be derived from the depth image. Whereas the depth image may comprise a full range of values, each value representing a different depth, a segmentation map may provide a binary (two-value) image comprising pixels of a first value representing estimated background pixels 312 and pixels of a second value representing estimated foreground pixels 314.

In some embodiments, such as where the resolution of the depth image is less than the resolution of the primary image, the pixels 312 and 314 of the segmentation map may be registered to one more corresponding pixels in the primary image. In other embodiments, such as where the resolution of the depth image is greater that the resolution of the primary image, the pixels of the primary image may be registered to one more corresponding pixels 312 and 314 of the segmentation map.

While the above description refers to a segmentation map derived from the depth image (e.g., via a skeletal tracking algorithm), it is to be understood that a segmentation map may be obtained in any suitable manner without departing from the scope of this disclosure. For example, a segmentation map may be obtained via analysis of an infrared light or visible light image.

Figure 4B:
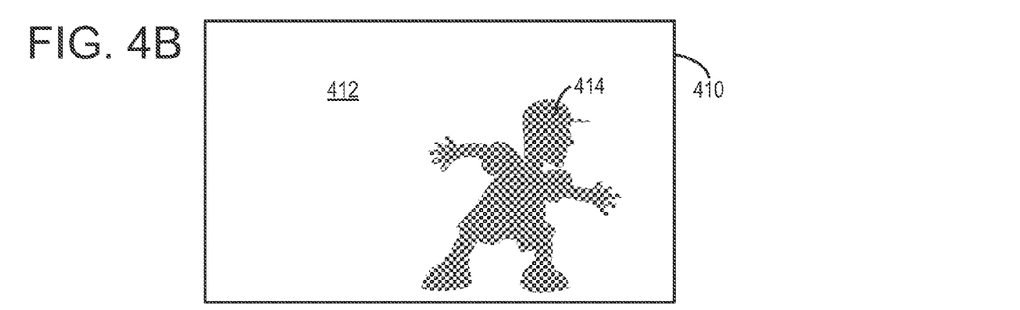
FIG. 4B shows a visual representation of a segmentation map of the primary image of FIG. 4A.

FIG. 4B shows a visual representation of a segmentation map 410 of the scene imaged by primary image 400 of FIG. 4A. The segmentation map 410 includes estimated background pixels 412 (illustrated as white space) corresponding to background object(s) 402 and estimated foreground pixels 414 (illustrated as a checkerboard pattern) corresponding to the foreground object 404.

Returning to FIG. 3, at 316, method 300 includes producing a trimap from the segmentation map. The trimap is a ternary (three-value) image comprising estimated background pixels 318, test pixels 320, and estimated foreground pixels 322. Test pixels 320 comprise one or more pixels existing at the boundary between estimated background pixels 312 and estimated foreground pixels 314 of the segmentation map. Estimated background pixels 318 comprise estimated background pixels 312 not identified as test pixels 320. Similarly, estimated foreground pixels 322 comprise estimated foreground pixels 314 not identified as test pixels 320. In some embodiments, the trimap may be of a different resolution than the segmentation map and/or the primary image.

Identifying the test pixels may be accomplished using a variety of methods. For example, test pixels 320 may be defined as any pixels within a defined distance (e.g. 10 pixels) of the boundary between estimated background pixels 312 and estimated foreground pixels 314. In another example, skeletal tracking may be used to define the region of test pixels 320 according to the proximity to one or more skeletal joints. When using skeletal tracking, a wider region around hair and fingers may be designated as test pixels 320, while a narrower region around torso may be designated as test pixels 320, for example. In another example of skeletal tracking, a polygonal region around a skeletal joint may be used to define a region of test pixels 320. These methods are exemplary and are not intended to be limiting.

Figure 4C:
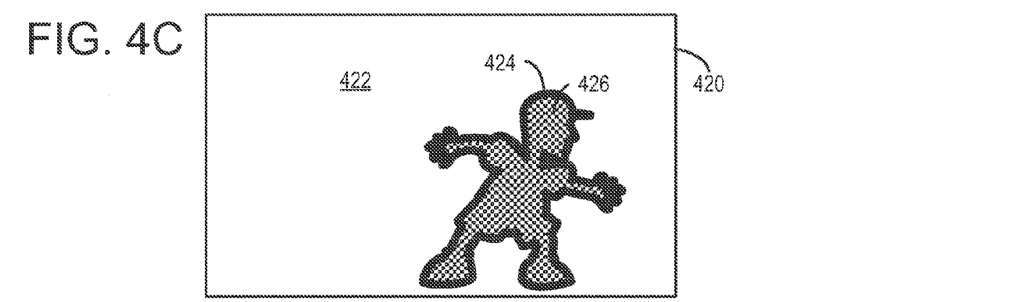
FIG. 4C shows a visual representation of a trimap generated from the segmentation map of FIG. 4B.

For example, FIG. 4C shows a visual representation of a trimap 420 generated from segmentation map 410 of FIG. 4B. The trimap 420 comprises estimated background pixels 422 (illustrated as white space), test pixels 424 (illustrated in black), and estimated foreground pixels 426 (illustrated as a checkerboard pattern).

In the illustrated embodiment, the test pixels 424 are illustrated as having a relatively consistent thickness around a perimeter of the estimated foreground pixels. However, the relative thickness (i.e., number of test pixels) may vary around a perimeter of the estimated foreground pixels. In general, more test pixels may provide better foreground object identification. However, more test pixels may also result in increased computational expense. As such, it may be advantageous to increase the relative number of test pixels in areas that are difficult to identify foreground objects (e.g., hair, fingers) and to decrease the relative number of test pixels in areas that are easier to identify foreground objects (e.g., torso).

Returning to FIG. 3, at 324, method 300 includes refining the trimap based on an analysis of primary pixels registered to test pixels. At 326, refining the trimap includes refining each of the estimated foreground pixels not identified as test pixels to confirmed foreground pixels. At 328, refining the trimap includes refining each of the estimated background pixels not identified as test pixels to confirmed background pixels. At 330, refining the trimap further includes refining each of the test pixels.

At 330, refining each of the test pixels may be accomplished utilizing a variety of methods and combinations of methods, including but not limited to executing a graph-cut algorithm 332, utilizing temporal feedback 334, and/or a combination thereof. In general if the visible light image is not used to generate the segmentation map, the visible light image may contain valuable information for improving the segmentation map. Only the true edges of a relatively smaller area need be "solved," thus providing a relatively simpler and more efficient approach to refining the test pixels.

A graph-cut algorithm 332 may be utilized to produce a high-quality segmentation image. First, a model may be created for the background object and the foreground object using the trimap and the primary image. The pixels in the primary image registered to background pixels in the trimap may be used to create a background model. Similarly, the pixels in the primary image registered to foreground pixels in the trimap may be used used to create the foreground model. A model encodes how the specified region "looks" (e.g. color) in the primary image.

Figure 5A:
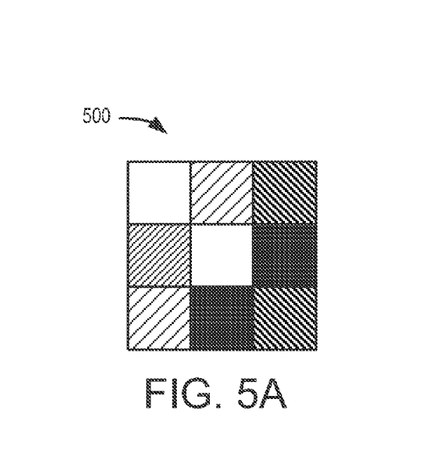
FIG. 5A shows a visual representation of a region of a primary image registered to test pixels
Figure 5B:
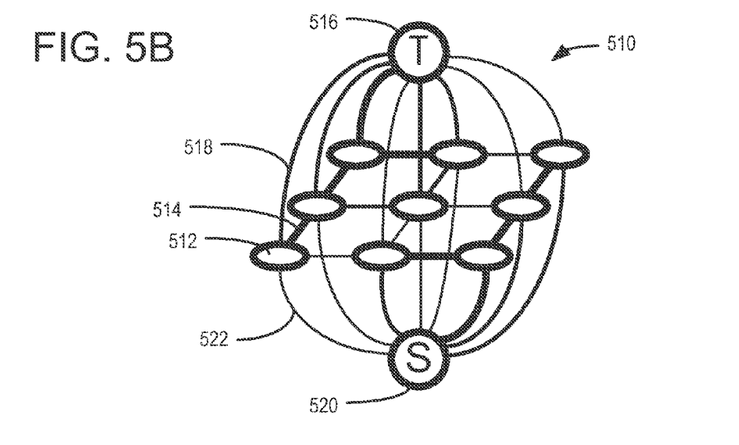
FIG. 5B shows a visual representation of a graph representing the energy of the system of FIG. 5A.

Next, a graph may be created wherein each pixel from the primary image that is registered to a test pixel is represented as a node connected to each neighboring pixel from the primary image. For example, FIG. 5A shows a visual representation of a region 500 (illustrated as a 3×3 grid) of a primary image registered to test pixels. FIG. 5B shows a visual representation of a graph 510 representing the energy of the system of region 500 of FIG. 5A. Graph 510 comprises nodes 512 representing pixels of region 500. Nodes 512 are connected to neighboring nodes via pixel connections 514. It will be understood that a graph is constructed for all primary pixels registered to test pixels of the trimap.

The weightings of pixel connections 514 represent the closeness (e.g. difference in color) between neighboring nodes 512. Nodes 512 are further connected to foreground model 516 through foreground connections 518, and to background model 520 through background connections 522. The weightings of foreground connections 518 and background connections 522 represent the closeness between pixels represented by nodes 512 and the respective models.

Figure 5C:
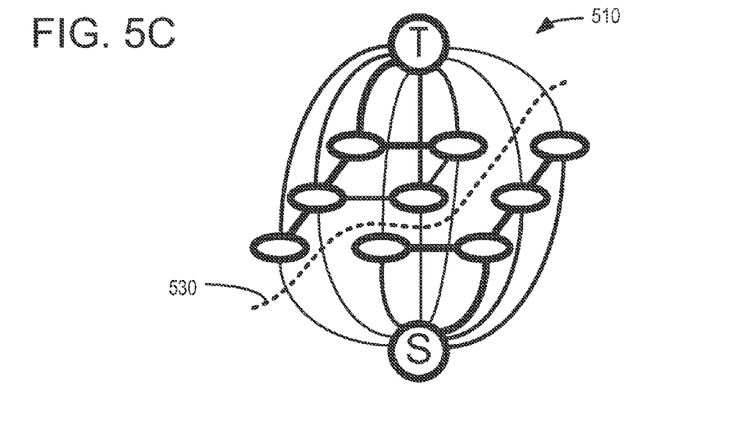
FIG. 5C shows a visual representation of a graph-cut performed on the graph of FIG. 5B.
Figure 5D:
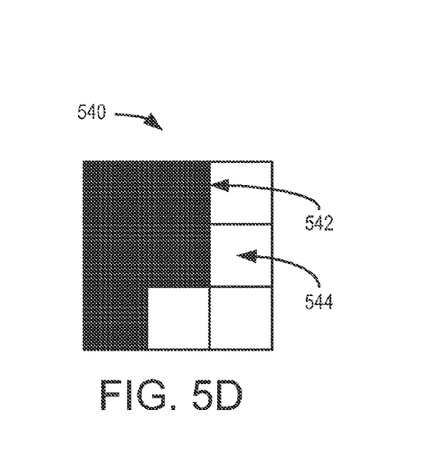
FIG. 5D shows a visual representation of confirmed pixels for the region of FIG. 5A.

Returning to FIG. 3, the graph-cut algorithm may then be iterated in order to refine the test pixels by "cutting" the thin edges and computing energy iteratively until the global maximum energy is found using the minimum number of "cuts". For example, FIG. 5C shows a visual representation of a graph-cut 530 performed on graph 510 of FIG. 5B. The graph-cut 530 is used to refine the trimap by classifying each pixel as a confirmed foreground pixel or a confirmed background pixel. For example, FIG. 5D shows a visual representation 540 of confirmed pixels for the region 500 of FIG. 5A. The confirmed pixels comprise confirmed foreground pixels 542 and confirmed background pixels 544.

Returning to FIG. 3, refining the test pixels in a sequence of frames, such as in a digital video, presents its own set of challenges. Even if the objects in the scene are unchanged between frames, noise, variations in lighting, and other factors may degrade the result of algorithms such as graph-cut algorithm 332. For example, while one of the test pixels 320 may have been classified as a confirmed foreground pixel in a previous frame, the same pixel may be classified as a confirmed background pixel in the current frame due to the one or more degrading factors, even though no movement occurred between frames. This may produce "flickering" in consecutive frames. In order to compensate for this, method 300 may utilize temporal feedback 334.

Temporal feedback may be any technique that utilizes at least some information from a previous frame in order to determine information about the current frame. One exemplary embodiment is described as follows. First, the primary pixels of the current frame registered to test pixels 320 of the current frame may be compared with the corresponding primary pixels of the previous frame. For each such pixel, if the difference in value between the current frame and the previous frame is within a pre-defined range, the pixel may be classified in the current frame the same way it was in the previous frame. If the difference is outside the pre-defined range, the test pixels 320 may remain as test pixels, which in turn may be refined via one or more techniques, such as graph-cut algorithm 332. This sort of temporal feedback may reduce computation time by reducing the number of test pixels 320 upon which an algorithm, such as graph-cut algorithm 332, is performed. Further, by comparing the result from one or more previous frames, visual artifacts such as flickering may be reduced.

At 336, method 300 may include producing a segmented image including the primary pixels registered to the confirmed foreground pixels but without the primary pixels registered to the confirmed background pixels. More generally, the primary pixels registered to the confirmed foreground pixels may be useable without the primary pixels registered to the confirmed background pixels, and vice versa.

Figure 4D:
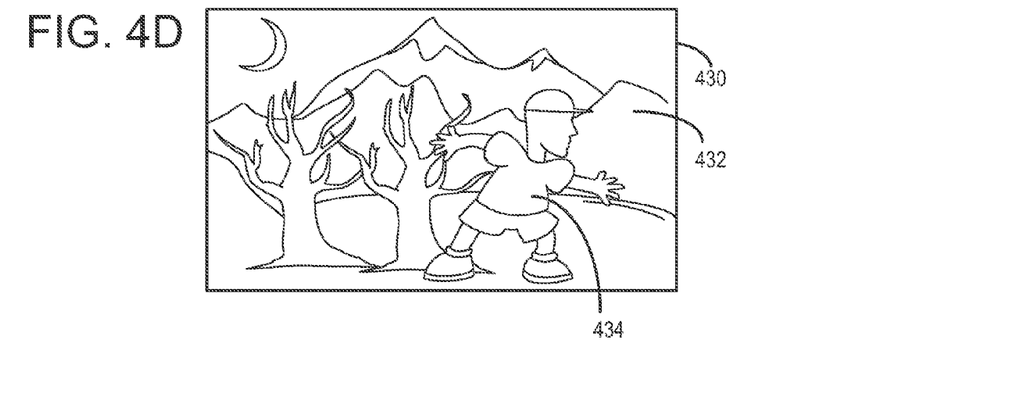
FIG. 4D shows a visual representation of a generated image comprising the foreground object of FIG. 4A.

For example, FIG. 4D shows a generated image 430 comprising background 432 and foreground object 434. Foreground object 434 comprises the primary pixels imaging foreground object 404 of FIG. 4A as identified via segmentation and refinement. Background 432 may be supplied by any acceptable source and may depict graphics, text, and/or a combination thereof. Further, background 432 may comprise pixels of a digital video stream. In other words, background 432 may not be fixed and may instead vary in time.

Returning to FIG. 3, the segmented image produced at 336 may be generated in any number of ways. At 338, the segmented image may include transparent or empty background pixels (i.e., pixels that will not be visible in a final rendered image). The segmented image may then act as an overlay on top of another image and/or image stream (e.g. digital video) in order to produce a final generated image.

At 340, background pixels from another image may be used with the segmented image, thus producing a final generated image.

At 342, method 300 may further include smoothing the foreground pixels. Smoothing may allow for a more natural transition between the foreground pixels and the new background. Smoothing may be accomplished using a variety of techniques and/or combination of techniques. For example, smoothing may include anti-aliasing 344 and/or alpha-blending 346. As one example, boundary pixels from the segmented image may be partially transparent so as to allow pixels from a background image to operatively show through the boundary pixels.

Figure 6:
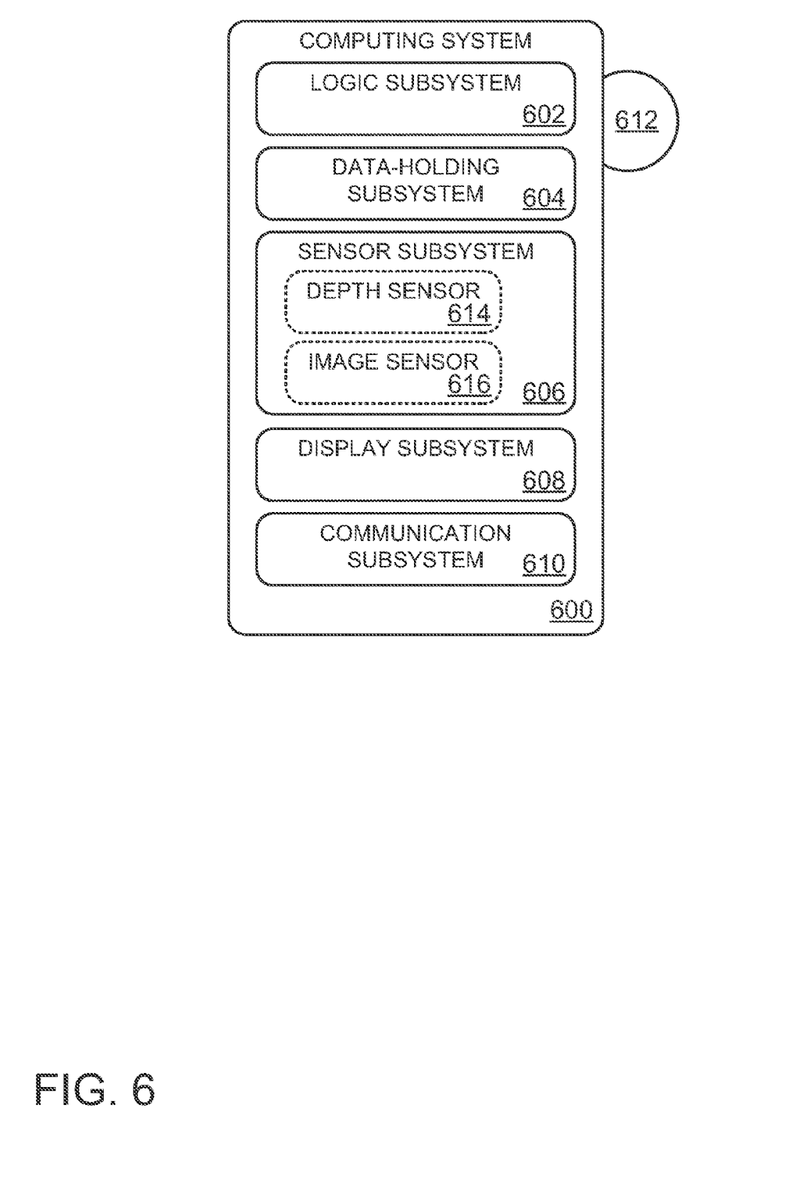
FIG. 6 schematically shows a computing system in accordance with an embodiment of the present disclosure.

FIG. 6 schematically shows a non-limiting computing system 600 that may perform one or more of the above described methods and processes. Computing system 600 is shown in simplified form. It is to be understood that virtually any computer architecture may be used without departing from the scope of this disclosure. Computing system 100 of FIG. 1 is a nonlimiting example of computing system 600. In different embodiments, computing system 600 may take the form of a mainframe computer, server computer, desktop computer, laptop computer, tablet computer, home entertainment computer, network computing device, mobile computing device, mobile communication device, gaming device, etc.

Computing system 600 includes a logic subsystem 602, a data-holding subsystem 604, and a sensor subsystem 606. Computing system 600 may optionally include a display subsystem 608, communication subsystem 610, and/or other components not shown in FIG. 6. Computing system 600 may also optionally include user input devices such as keyboards, mice, game controllers, cameras, microphones, and/or touch screens, for example.

Logic subsystem 602 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 604 may include one or more physical, non-transitory, devices configured to hold data and/or instructions executable by the logic subsystem to implement the herein described methods and processes. When such methods and processes are implemented, the state of data-holding subsystem 604 may be transformed (e.g., to hold different data).

Data-holding subsystem 604 may include removable media and/or built-in devices. Data-holding subsystem 604 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 604 may include devices with one or more of the following characteristics: volatile, nonvolatile, dynamic, static, read/write, read-only, random access, sequential access, location addressable, file addressable, and content addressable. In some embodiments, logic subsystem 602 and data-holding subsystem 604 may be integrated into one or more common devices, such as an application specific integrated circuit or a system on a chip.

FIG. 6 also shows an aspect of the data-holding subsystem in the form of removable computer-readable storage media 612, which may be used to store and/or transfer data and/or instructions executable to implement the herein described methods and processes. Removable computer-readable storage media 612 may take the form of CDs, DVDs, HD-DVDs, Blu-Ray Discs, EEPROMs, and/or floppy disks, among others.

It is to be appreciated that data-holding subsystem 604 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

Sensor subsystem 606 may include one or more sensors, as described above. For example, the sensor subsystem 606 may comprise one or more image sensors and/or depth sensors. Therefore, sensor subsystem 606 may be configured to provide observation information to logic subsystem 602, for example. As described above, observation information such as image data, depth data, motion sensor data, and/or any other suitable sensor data may be used to perform such tasks as classifying pixels in a digital image comprising a foreground object and a background object.

In some embodiments, sensor subsystem 606 may include one or more depth sensor 614 (e.g., depth sensor 110 of FIG. 1). Depth sensor 614 may include left and right cameras of a stereoscopic vision system, for example. Time-resolved images from both cameras may be registered to each other and combined to yield depth-resolved video.

In other embodiments, depth sensor 614 may be a structured light depth camera configured to project a structured infrared illumination comprising numerous, discrete features (e.g., lines or dots). Depth sensor 614 may be configured to image the structured illumination reflected from a scene onto which the structured illumination is projected. Based on the spacings between adjacent features in the various regions of the imaged scene, a depth image of the scene may be constructed.

In other embodiments, depth sensor 614 may be a time-of-flight camera configured to project a pulsed infrared illumination onto the scene. The depth sensor may include one or more cameras configured to detect the pulsed illumination reflected from the scene. Such cameras may include an electronic shutter synchronized to the pulsed illumination, but the integration times for the cameras may differ, such that a pixel-resolved time-of-flight of the pulsed illumination, from the source to the scene and then to the cameras, is discernable from the relative amounts of light received in corresponding pixels of the two cameras.

In some embodiments, sensor subsystem 606 may include one or more image sensors 616 (e.g., image sensor 112 of FIG. 1). Virtually any type of digital imaging technology may be used without departing from the scope of this disclosure. As a non-limiting example, image sensor 616 may include a charge coupled device image sensor.

When included, display subsystem 608 may be used to present a visual representation of data held by data-holding subsystem 604. As the herein described methods and processes change the data held by the data-holding subsystem, and thus transform the state of the data-holding subsystem, the state of display subsystem 608 may likewise be transformed to visually represent changes in the underlying data. Display subsystem 608 may include one or more display devices utilizing virtually any type of technology. Such display devices may be combined with logic subsystem 602 and/or data-holding subsystem 604 in a shared enclosure, or such display devices may be peripheral display devices.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, a wireless local area network, a wired local area network, a wireless wide area network, a wired wide area network, etc. In some embodiments, the communication subsystem may allow computing system 600 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of classifying pixels in a digital image, the method comprising:
   receiving a primary image from one or more image sensors, the primary image including a plurality of primary pixels;
   receiving a depth image from one or more depth sensors, the depth image including a plurality of depth pixels, each depth pixel registered to one or more primary pixels; and
   cooperatively using the depth image and the primary image to identify whether a primary pixel images a foreground subject or a background subject.

2. A method of classifying pixels in a digital image, the method comprising:
   receiving a primary image from one or more image sensors, the primary image including a plurality of primary pixels;
   receiving a depth image from one or more depth sensors, the depth image including a plurality of depth pixels, each depth pixel registered to one or more primary pixels;
   producing a segmentation map from the depth image, the segmentation map including a plurality of estimated foreground pixels and a plurality of estimated background pixels;
   producing a trimap from the segmentation map, the trimap matching the segmentation map but including a plurality of test pixels at one or more boundaries between estimated foreground pixels and estimated background pixels; and
   refining each of the test pixels to either a confirmed foreground pixel or a confirmed background pixel based on an analysis of primary pixels registered to test pixels.

3. The method of claim 2, further comprising refining each of the estimated foreground pixels not identified as test pixels to confirmed foreground pixels, and refining each of the estimated background pixels not identified as test pixels to confirmed background pixels.

4. The method of claim 3, where the primary pixels registered to the confirmed foreground pixels are useable without the primary pixels registered to the confirmed background pixels.

5. The method of claim 3, further comprising producing a segmented image including the primary pixels registered to the confirmed foreground pixels but without the primary pixels registered to the confirmed background pixels.

6. The method of claim 5, where pixels of the segmented image registered to the confirmed background pixels are transparent pixels.

7. The method of claim 5, where pixels of the segmented image registered to the confirmed background pixels are from another image.

8. The method of claim 5, where one or more pixels of the segmented image registered to the confirmed foreground pixels are smoothed.

9. The method of claim 8, where the one or more pixels of the segmented image registered to the confirmed foreground pixels are smoothed via anti-aliasing.

10. The method of claim 8, where the one or more pixels of the segmented image registered to the confirmed foreground pixels are smoothed via alpha-blending.

11. The method of claim 8, where the one or more pixels of the segmented image registered to the confirmed foreground pixels include boundary pixels.

12. The method of claim 2, where refining each of the test pixels comprises executing a graph-cut algorithm.

13. The method of claim 2, where refining each of the test pixels comprises utilizing temporal feedback.

14. The method of claim 2, where the image sensor is a visible light sensor.

15. The method of claim 2, where the image sensor is an infrared light sensor.

16. A method of classifying pixels in a digital image, the method comprising:
   receiving a primary image from one or more image sensors, the primary image including a plurality of primary pixels;
   receiving a depth image from one or more depth sensors, the depth image including a plurality of depth pixels, each depth pixel registered to one or more primary pixels;
   recognizing a plurality of estimated background pixels derived from the depth image, each estimated background pixel registered to one or more primary pixels and identifying subjects imaged by those one or more primary pixels as background subjects;
   recognizing a plurality of estimated foreground pixels derived from the depth image, each estimated foreground pixel registered to one or more primary pixels and identifying subjects imaged by those one or more primary pixels as foreground subjects;
   identifying estimated foreground pixels near estimated background pixels and/or estimated background pixels near estimated foreground pixels as test pixels; and
   refining each of the test pixels to either a confirmed foreground pixel or a confirmed background pixel based on a graph cut analysis of primary pixels registered to test pixels.

17. The method of claim 16, further comprising refining each of the estimated foreground pixels not identified as test pixels to confirmed foreground pixels, and refining each of the estimated background pixels not identified as test pixels to confirmed background pixels.

18. The method of claim 17, where the primary pixels registered to the confirmed foreground pixels are useable without the primary pixels registered to the confirmed background pixels.

19. The method of claim 17, further comprising producing a segmented image including the primary pixels registered to the confirmed foreground pixels but without the primary pixels registered to the confirmed background pixels.

20. The method of claim 16, where refining each of the test pixels comprises utilizing temporal feedback.

* * * * *